(12) United States Patent
Zhou

(10) Patent No.: US 6,899,343 B2
(45) Date of Patent: May 31, 2005

(54) MANUALLY TIGHTENED CHUCK

(76) Inventor: Wenhua Zhou, No. 200 Ji Chang Rd., Lu Qiao District, Taizhou City, Zhejiang Province 318050 (CN)

( * ) Notice: Subject to any disclaimer, the term of this patent is extended or adjusted under 35 U.S.C. 154(b) by 165 days.

(21) Appl. No.: 10/309,876

(22) Filed: Dec. 3, 2002

(65) Prior Publication Data
US 2004/0041357 A1 Mar. 4, 2004

(30) Foreign Application Priority Data
Aug. 28, 2002 (CN) .......................... 02246478 U

(51) Int. Cl.$^7$ ............................................. B23B 31/10
(52) U.S. Cl. ......................................... 279/62; 279/902
(58) Field of Search ........................... 279/60, 61, 62, 279/902

(56) References Cited

U.S. PATENT DOCUMENTS

| | | | |
|---|---|---|---|
| 3,910,589 A | 10/1975 | Derbyshire | 279/61 |
| 3,938,817 A * | 2/1976 | Rohm | 279/61 |
| 4,065,139 A | 12/1977 | Rohm | 279/62 |
| 4,395,170 A | 7/1983 | Clarey | 408/241 R |
| 5,125,673 A | 6/1992 | Huff et al. | 279/60 |
| 5,934,690 A * | 8/1999 | Lin | 279/62 |
| 6,247,705 B1 | 6/2001 | Yang et al. | 279/62 |
| 6,428,018 B1 | 8/2002 | Aultman et al. | 279/61 |
| 6,540,236 B2 * | 4/2003 | Aultman et al. | 279/61 |
| 2004/0032094 A1 | 2/2004 | Zhou | 279/62 |

FOREIGN PATENT DOCUMENTS

| | | |
|---|---|---|
| CN | 2322725 Y | 6/1999 |
| EP | 0 340 310 A1 | 11/1989 |
| GB | 2 030 485 A | 4/1980 |

* cited by examiner

Primary Examiner—Daniel W. Howell
Assistant Examiner—Michael W. Talbot
(74) Attorney, Agent, or Firm—Ladas & Parry LLP

(57) ABSTRACT

A manually tightened chuck, having a hollow chuck body member, provided with three inclined bores along periphery with same interval in chuck body member. A jaw is installed in each inclined bore slidably. A nut is sheathed in the middle of chuck body member, and the nut is interconnected with each jaw through threads. A front sleeve is provided at the front end of the chuck body member, and a rear sleeve is provided at the rear end. The nut is of duplex-half type structure, on its peripheral surface a nut sleeve is sheathed, between the nut sleeve and the nut is of stationary fit. The profile of said nut sleeve is a polygon, a polygonal hole fitted with said outer profile is formed correspondingly in the inner part of said front sleeve. The machining of both front and nut sleeves of the chuck is more simple, and both front and nut sleeves are more stable after installation, during operation of the chuck no radial jitter of both front and nut sleeves is created.

14 Claims, 3 Drawing Sheets

US 6,899,343 B2

MANUALLY TIGHTENED CHUCK

FIELD OF THE INVENTION

The present invention relates to a modified manually tightened chuck, especially to a manually tightened chuck mounted in machining equipments, for example, a drilling machine tool.

BACKGROUND OF THE INVENTION

In the prior art, a manually tightened chuck generally comprises chuck body member, jaw, nut, front sleeve and rear sleeve. Chinese Patent CN 2322725 authorized on Jun. 9, 1999 discloses a manually tightened chuck, the chuck comprises chuck body member, jaw, nut, front sleeve and rear sleeve. Three jaws are placed respectively in three inclined bores distributed uniformly on the chuck body member. Between the nut and the jaw thread connection is adopted, the rear end of the nut is provided with a thrust bearing, and the rear end of the thrust bearing is provided with a blocking ring, and on the rear end of the chuck body member the rear sleeve is assembled. The nut is of duplex-half structure. The duplex-half structure is combined into a integral through a nut sleeve, between the nut sleeve and the nut is of stationary fit, a key connection is adopted for torque transmission between the front sleeve and the nut sleeve, an annular protruding is formed in the inner surface of the front end of front sleeve, the chuck body member at the position corresponding to the protruding is provided with a annular groove, the axial orientation of front sleeve is achieved by said protruding fitting with said groove. The disadvantages of the manually tightened chuck are:

Since a key connection is adopted between the front sleeve and the nut sleeve, the machining of both front and nut sleeves of the chuck is more complex, and the key connection causes radial gaps between the front sleeve and the nut sleeve, thereby larger radial jitter may be created in the front sleeve during operation of the chuck.

SUMMARY OF THE INVENTION

One object of this invention is to overcome the disadvantages of the prior art mentioned above and provides a modified manually tightened chuck. It is not only the machining of front sleeve and nut sleeve more simple, but the front sleeve and the nut sleeve are more stable after installing, radial jitter may not be created in both front sleeve and nut sleeve during operation of the chuck.

According to this invention, it is provided a modified manually tightened chuck, the chuck comprises a hollow chuck body member, provided with three inclined bores along periphery with same interval in said chuck body member. A jaw is installed in each inclined bore slidably, a nut is sheathed in the middle of said chuck body member, and said nut is interconnected with each said jaw through thread. A front sleeve is provided at the front end of said chuck body member, a rear sleeve is provided with at the rear end, said nut is of duplex-half type structure, on its peripheral surface a nut sleeve is sheathed, between said nut sleeve and said nut is of stationary fit. The outer profile of said nut sleeve is of a polygon, a polygonal hole fitted with said outer profile is formed correspondingly in the inner part of said front sleeve.

The present invention has the following advantages over prior art: since the fitting of the polygon and the polygonal hole is adopt for torque transmission between the front sleeve and the nut sleeve, the key and key groove of the front sleeve and the nut sleeve are saved, it is not only more simply for machining of the front sleeve and the nut sleeve, but also the front sleeve and the nut sleeve are more stable after installation, there are not any radial jitter created in both the front and nut sleeve during operation of the chuck.

BRIEF DESCRIPTION OF THE DRAWINGS

Further features and advantages of the invention will be explained in detail in conjunction with the embodiment shown by the accompany drawings, wherein.

DETAILED DESCRIPTION OF PREFERRED EMBODIMENTS

Before describing the invention in detail, it is necessary to define related terminologies as follows:

The "front end" in the invention refers to the end where a drill is held by respective jaws in the modified manually tightened chuck, i.e. the lower end as viewed in FIGS. 1, 3, 4 and 5.

The "rear end" in the invention refers to the end to be connected with machine tool in the modified manually tightened chuck, for example, a drilling machine tool, i.e. the upper end as viewed in FIGS. 1, 3, 4 and 5.

Figure 1:
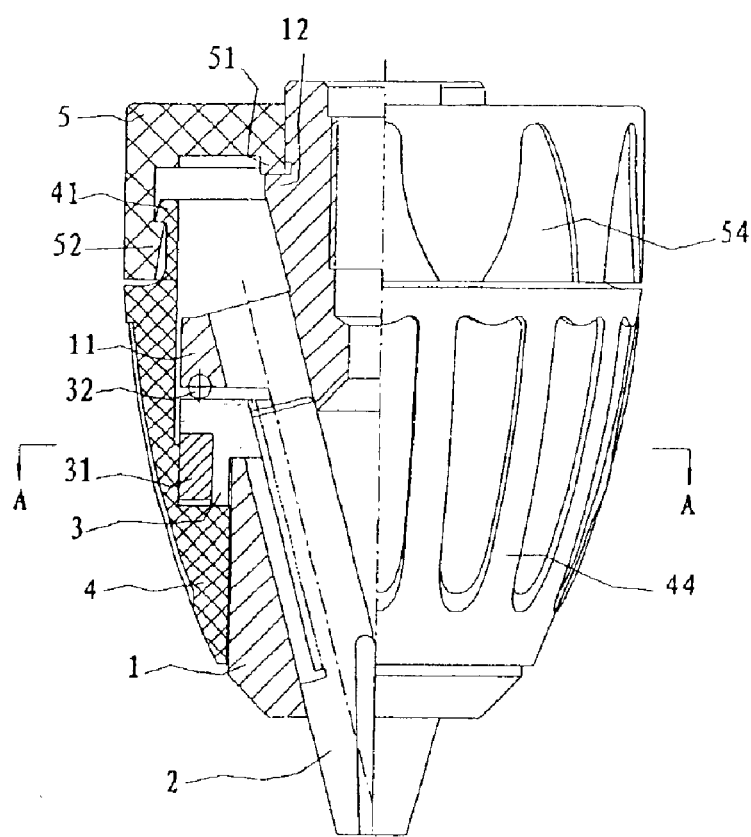
FIG. 1 is a half partial section view of an embodiment of modified manually tightened chuck according to the invention, which shows inner structure and appearance of the chuck.

Referring to FIG. 1, as an embodiment of the invention, a modified manually tightened chuck shown in the figure which comprises a hollow chuck body member 1, provided with three inclined bores along its periphery with a common interval in said chuck body member 1. A jaw 2 is slidably installed in each inclined bore. A nut 3 is sheathed in the middle of said chuck body member 1, and said nut 3 is interconnected with each said jaw 2 through threads. A front sleeve 4 is provided at the front end of said chuck body member 1, and a rear sleeve 5 is provided at the rear end, said nut 3 is of duplex-half type structure, on its peripheral surface a nut sleeve 31 is sheathed, and between said nut sleeve 31 and said nut 3 is a tight fit.

Figure 2:
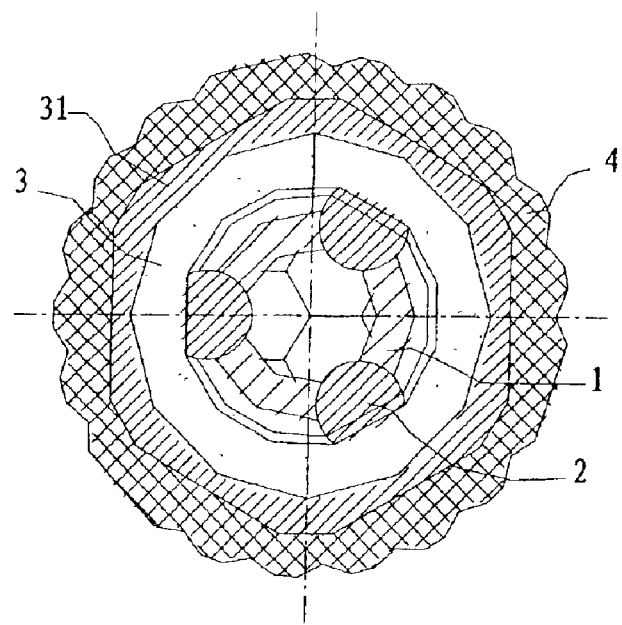
FIG. 2 is a section view along line A—A of FIG. 1, which shows the structure for torque transmission between the front sleeve and the nut sleeve.

As shown in FIG. 2, in the embodiment of the invention, the outer profile of said nut sleeve 31 is polygon, and the polygonal hole fitted with said outer profile is formed correspondingly in said front sleeve 4. As shown in the figure, the profile of the cross-section of said polygon and said polygonal hole is approximately that of a right hexagon. When rotating front sleeve 4, torque will be transmitted to nut sleeve 31 through above-mentioned structure, and the tight fit between nut sleeve 31 and nut 3, thereby the causing rotation of nut 3. The front end of said rear sleeve 5 and the rear end of said front sleeve 4 are provided with an inter fitted chucking hook, by means of the chucking hook said rear sleeve 5 and said front sleeve 4 are connected with each other.

In the above mentioned embodiment shown in FIG. 1, said rear sleeve 5 includes a peripheral wall, the rear end of said peripheral wall forms an end wall extending inwardly along a radial direction, and an inner hole is formed in the end wall. In the lower part of the wall adjacent the inner hole a flange 51 is formed, the lower surface of the flange 51 resting against the top surface of projecting shoulder 12 rear end of said chuck body member 1. Said shoulder extends outwardly from its outer periphery along a radial direction; an annular protrusion 52 extending inwardly along the radial direction is formed at the front end of said peripheral wall, said annular protrusion 52 forms a inner hook; the rear end of said front sleeve 4 contracts inwardly at the position corresponding to said annular protrusion 52, the end of said contracted part forms an outer hook 41 fitted with said inner hook, by means of the fitting of said outer hook 41 and inner hook, chucking of said front sleeve 4 and rear sleeve 5 can be achieved.

Figure 3:
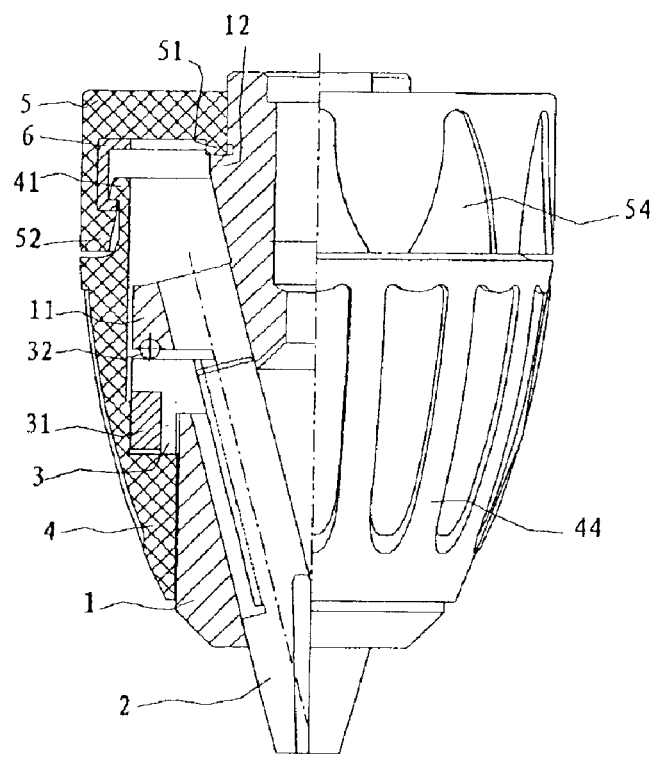
FIG. 3 is a half partial section view of another embodiment of modified manually tightened chuck according to the invention, which shows another inner structure of the chuck.

Referring now to FIG. 3, an another embodiment of the invention, an annular protruding 52 extending inwardly along the radial direction is formed at the front end of said peripheral wall, an embedded piece 6 is embedded between said annular protrusion 52 and said end wall and forms an inner hook; the rear end of said front sleeve 4 contracts inwardly at the position corresponding to said annular protrusion 52, the end of said contracted part forms an outer hook 41 fitted with the inner hook, the chucking of said front sleeve 4 and rear sleeve 5 can be achieved through the fitting of said outer hook 41 and the inner hook.

It is clearly shown in the two embodiments given above in FIGS. 1 and 3, the inner surface of the hook head of said inner hook is a conical surface inclined backwardly; the outer surface of the hook head of said outer hook (41) is also a conical surface inclined backwardly. During installation chucking of said outer hook 41 and inner hook can be achieved by using elastic deformation of said front sleeve 4, in the meantime the leading effect of said two conical surfaces convenience the installation.

Figure 4:
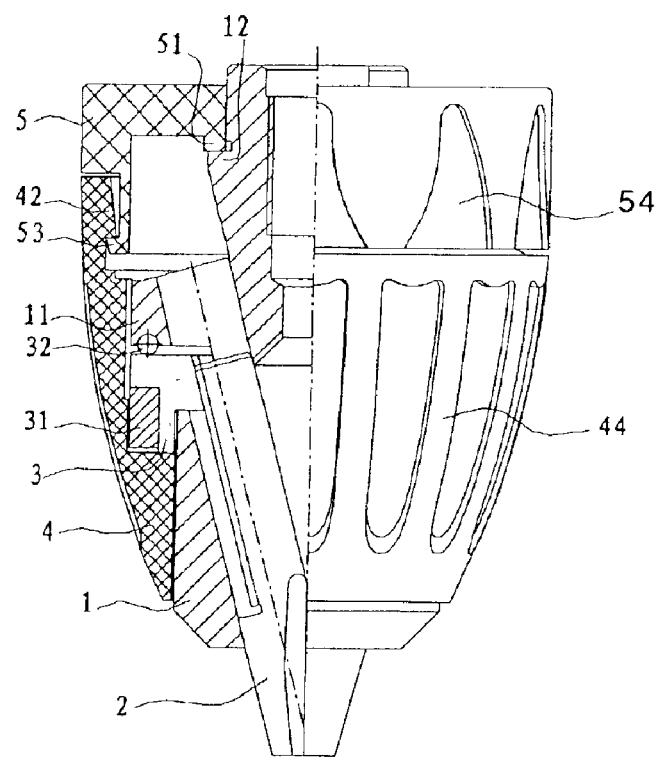
FIG. 4 is a half partial section view of further embodiment of modified manually tightened chuck according to the invention, which shows other inner structure of the chuck.

Referring to FIG. 4, an another embodiment of the invention, as shown in the figure, the differences between this embodiment and above mentioned respective embodiment are: the front end of the peripheral wall of said rear sleeve 5 contracts inwardly, the front end of said contracted part forms an outer hook 53; the rear end of said front sleeve 4 forms an annular protrusion extending inwardly along radial direction, said annular protrusion forms an inner hook fitted with said outer hook 53, the chucking of the front sleeve 4 and the rear sleeve 5 is achieved through the fitting of said outer hook 53 and inner hook.

Figure 5:
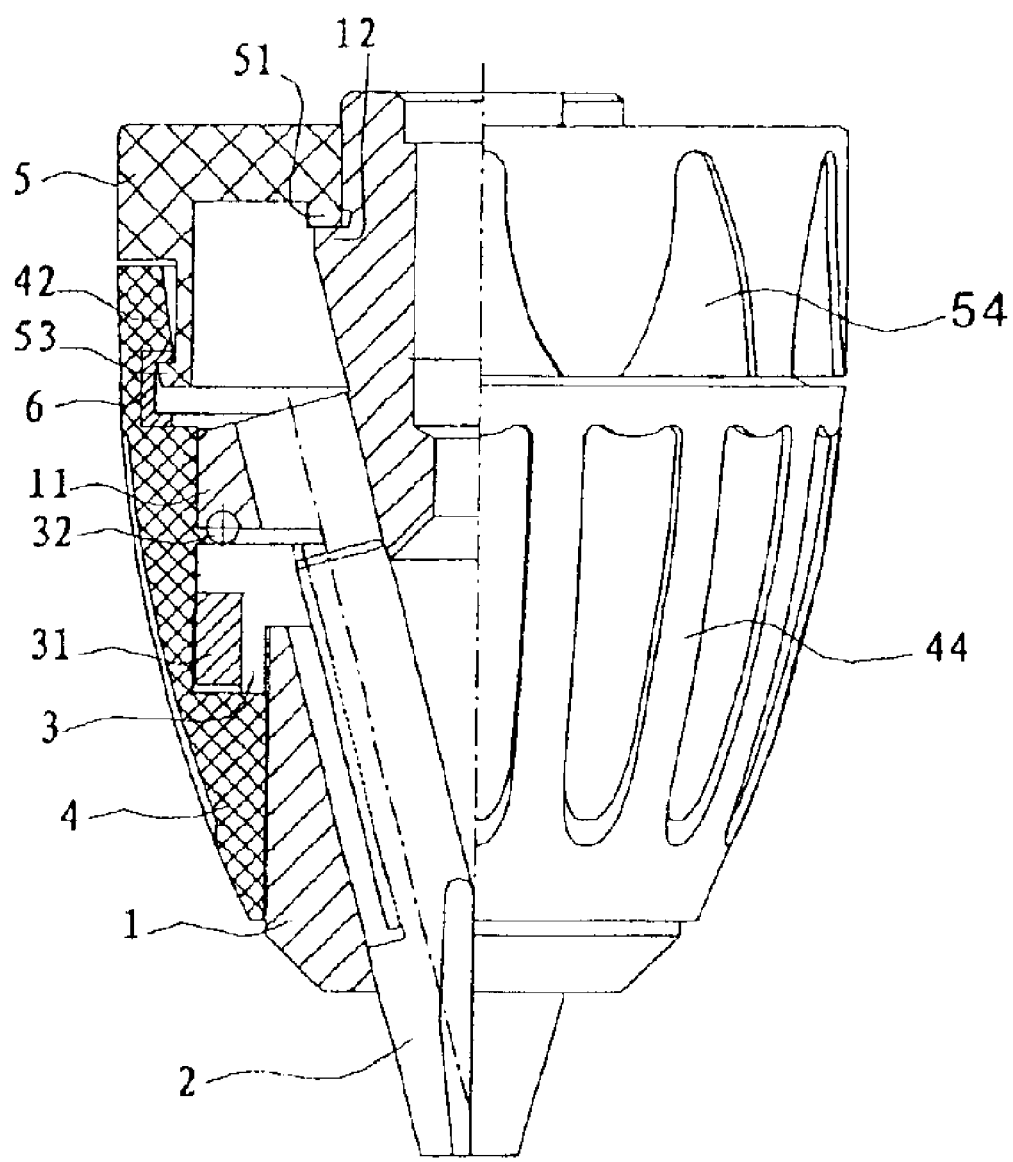
FIG. 5 is a half partial section view of further embodiment of modified manually tightened chuck according to the invention, which shows further inner structure of the chuck.

Referring to FIG. 5, a further embodiment of the invention, as shown in the figure, the front end of the peripheral wall of said rear sleeve 5 contracts inwardly, the front end of said contracted part forms an outer hook 53; the rear end of said front sleeve 4 forms an annular protrusion 42 extending inwardly along radial direction, an embedded piece 6 is embedded in the lower part of said annular protrusion 42, and forms an inner hook fitted with said outer hook 53, the chucking of the front sleeve 4 and the rear sleeve 5 is achieved through the fitting of said outer hook 53 and the inner hook.

It is clearly shown in two embodiments given above respectively in FIG. 4 and FIG. 5, the outer surface of hook head of said outer hook 53 is a conical surface inclined forwardly; the inner surface of the hook head of said inner hook is also a conical surface inclined forwardly, during installation the chucking of said outer hook 53 and inner hook is achieved by using elastic deformation of said rear sleeve 5, in the mean time the leading effect of said two conical surfaces convenience the installation.

As shown in FIGS. 1, 3, 4 and 5, in each of the above embodiments of the invention, a stepped part 11 extending outwardly along radial direction is formed in the middle part of said chuck body member 1, said stepped part 11 has a surface opposite to the rear end face of said nut 3, a recessing annular orbit machined is on said surface or the rear end face of said nut 3 opposite to said surface, a plurality of rolling balls 32 disposed in said annular orbit, through these rolling balls related rotational movement between said nut 3 and said chuck body member 1 can be achieved. As shown in the figure, in the embodiments of the invention, said concave annular orbit is formed on the end face of the stepped part of said chuck body member 1.

As shown in FIG. 1 and FIG. 3, in each embodiment given above, the outer peripheral surface of said front sleeve 4 and rear sleeve 5 forms a plurality of convex ridges and concave grooves 44, 54 respectively, for installing and replaced drill by operator.

The modified manually tightened chuck according to the invention, the operation procedure of the modified manually tightened chuck is as follows: firstly, by means of the thread hole in the upper end of the chuck body member, the chuck is fixed to the spindle of a drilling machine tool, not shown, by rotating the front sleeve counterclockwise (seen from the front end of the chuck). The nut rotates with the front sleeve, so as to cause the three jaws to move upwardly simultaneously to increase a bit receiving open between the jaws. Next, a drill bit is inserted into the aforementioned opening, rotating the front sleeve clockwise, so as to cause the nut to rotate, and causing the three jaws to move downward, and tightened against the drill bit after which drilling could be performed. If the drill bit needs to be replaced, the operation procedure is reversed.

The above-described embodiment is a preferred form of the invention, and not for the limitation of it. Certain substitutions and modifications may be made without departing from the scope and spirit of the appended claims.

What is claimed is:

1. A manually tightened chuck, comprising: a hollow chuck body member; three inclined bores along periphery, provided with same interval in said chuck body member; three jaws, slidably installed in each inclined bore respectively; a nut, provided in the middle of said chuck body member, said nut interconnected with each said jaw through threads; a front sleeve provided at the front end of said chuck body member; a rear sleeve sheathed at the rear end of said chuck body member; a nut sleeve sheathed on peripheral surface of said nut, said nut being of a duplex-half structure and said nut sleeve and said nut being tightly fit; the outer profile of said nut sleeve being of a polygon, a polygonal hole fitted with said outer profile being formed correspondingly in the inner part of said front sleeve.

2. The manually tightened chuck as set forth in claim 1, wherein the cross-section of said polygon and said polygonal hole are approximately a right hexagon.

3. The manually tightened chuck as set forth in claim 1, wherein an inter fitted chucking hook is disposed at the front end of said rear sleeve and said the rear end of said front sleeve, said rear sleeve and said front sleeve being connected with each other.

4. The manually tightened chuck as set forth in claim 3, wherein said rear sleeve includes a peripheral wall, and an end wall extending inwardly along radial direction is formed at the rear end of said peripheral wall, an inner hole is formed in said end wall, a flange is formed at the lower end part of said end wall adjacent said inner hole, the lower surface of said flange rests against a top surface of a projecting shoulder of the rear end of said chuck body member, said shoulder extending outwardly from outer peripheral surface along a radial direction.

5. The manually tightened chuck as set forth in claim 4, wherein an annular protrusion extending inwardly along radial direction is formed at the front end of said peripheral wall, said annular protrusion forms a inner hook; and the rear end of said front sleeve contracts inwardly at the position corresponding to said annular protrusion, the end of said contracted part forming an outer hook fitted with said inner hook.

6. The manually tightened chuck as set forth in claim 4, wherein an annular protrusion extending inwardly along radial direction is formed at the front end of said peripheral wall, an embedded piece is embedded between said annular protrusion and said end wall and forms an inner hook; and the rear end of said front sleeve contracts inwardly at the position corresponding to said annular protrusion, the end of said contracted part forming an outer hook fitted with inner hook.

7. The manually tightened chuck as set forth in claim 5, wherein the inner surface of the hook head of said inner hook is a conical surface inclined backwardly; and the outer surface of the hook head of said outer hook is a conical surface inclined backwardly.

8. The manually tightened chuck as set forth in claim 4, wherein the front end of the peripheral wall of said rear sleeve contracts inwardly, the front end of said contracted part forms an outer hook; and the rear end of said front sleeve forms an annular protrusion extending inwardly along radial direction, said annular protrusion forms an inner hook fitted with said outer hook.

9. The manually tightened chuck as set forth in claim 4, wherein the front end of the peripheral wall of said rear sleeve is contracted inwardly, the front end of said contracted part forms an outer hook; and the rear end of said front sleeve forms an annular protruding extending inwardly along radial direction, an embedded piece is embedded in the lower part of said annular protruding, and forms an inner hook fitted with said outer hook.

10. The manually tightened chuck as set forth in claim 8, wherein the outer surface of hook head of said outer hook is a conical surface inclined forwardly; and the inner surface of the hook head of said inner hook is also a conical surface inclined forwardly.

11. The manually tightened chuck as set forth in claim 1, wherein a stepped part extending outwardly along radial direction is formed in the middle part of said chuck body member, said stepped part has a surface opposite to the rear end face of said nut, a recessing annular orbit machined is on said surface or the rear end face of said nut opposite to said surface, a plurality of rolling balls disposed in said annular orbit.

12. The manually tightened chuck as set forth in claim 1, wherein the outer peripheral surface of said front sleeve and rear sleeve forms a plurality of convex ridges and concave grooves, respectively.

13. The manually tightened chuck as set forth in claim 6, wherein the inner surface of the hook head of said inner hook is a conical surface inclined backwardly; and the outer surface of the hook head of said outer hook is a conical surface inclined backwardly.

14. The manually tightened chuck as set forth in claim 9, wherein the outer surface of hook head of said outer hook is a conical surface inclined forwardly; and the inner surface of the hook head of said inner hook is also a conical surface inclined forwardly.

* * * * *